United States Patent
Malkin et al.

(10) Patent No.: US 7,369,247 B2
(45) Date of Patent: May 6, 2008

(54) SENSING COIL ASSEMBLY AND METHOD FOR ATTACHING A SENSING COIL IN A FIBER OPTIC GYROSCOPE

(75) Inventors: Michael M. Malkin, Scottsdale, AZ (US); Charles H. Lange, Glendale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 142 days.

(21) Appl. No.: 11/280,719

(22) Filed: Nov. 15, 2005

(65) Prior Publication Data

US 2007/0110365 A1    May 17, 2007

(51) Int. Cl.
*G01C 19/72* (2006.01)
(52) U.S. Cl. .................................................... 356/465
(58) Field of Classification Search ................ 356/460, 356/465
See application file for complete search history.

(56) References Cited

U.S. PATENT DOCUMENTS 5,220,632 A * 6/1993 LoStracco ................... 385/134
5,759,470 A * 6/1998 Steelman et al. ............ 242/159
2002/0167673 A1* 11/2002 Gregory ...................... 356/465
2002/0179760 A1* 12/2002 Gregory ................... 242/118.4

* cited by examiner

*Primary Examiner*—Samuel A. Turner
(74) *Attorney, Agent, or Firm*—Black Lowe & Graham, PLLC

(57) ABSTRACT

A sensing coil assembly and method for attaching a sensing coil to a support structure are provided for a fiber optic gyroscope. The method comprises affixing a preformed adhesive to a mating surface of a mounting structure, and coupling an inner surface of the sensing coil to the mating surface of the mounting structure via the preformed adhesive. The mating surface is substantially cylindrical or conical. The sensing coil assembly comprises a hub having a mating surface, an optical fiber coil having an inner surface encircling at least a portion of the mating surface, and a preformed adhesive pattern affixing the mating surface to the inner surface. The mating surface of the hub is substantially cylindrical or conical.

12 Claims, 2 Drawing Sheets

SENSING COIL ASSEMBLY AND METHOD FOR ATTACHING A SENSING COIL IN A FIBER OPTIC GYROSCOPE

FIELD OF THE INVENTION

The present invention generally relates to fiber optic gyroscope systems, and more particularly relates to an attachment system and method for attaching a sensing coil in a fiber optic gyroscope system.

BACKGROUND OF THE INVENTION

Gyroscopes have been used to measure rotation rates or changes in angular velocity about an axis. A basic conventional fiber optic gyroscope (FOG) includes a light source, a beam generating device (e.g., a beam-splitter), and a coil of optical fiber coupled to the beam generating device that encircles an area. The beam generating device transmits light beams originating from the light source into the coil of optical fiber, and these light beams propagate in a clockwise (CW) direction and a counter-clockwise (CCW) direction along the core of the optical fiber. The two counter-propagating (e.g., CW and CCW) beams experience different pathlengths while propagating around a rotating path, and the difference between the two pathlengths produces a phase difference between the two counter-propagating beams that is proportional to the rotational rate.

Many FOGs utilize a glass-based optical fiber to conduct light along a core of the fiber over long distances with low loss and distortion. This optical fiber has a glass/silica core surrounded by a polymer jacket, or buffer, and may be wound into a cylindrical structure, such as a coil, and affixed to a coil-supporting structure, such as a cylindrical hub, to form a sensing coil. The hub and fiber optic coil are both substantially cylindrical structures oriented about a center axis, and the hub has a relatively smaller radius than the radius of the fiber optic coil. An adhesive coating between the outer surface of the hub and inner surface of the fiber optic coil may be used to affix the fiber optic coil to the hub.

Because the optical fiber is a composite structure, the glass/silica core and the polymer buffer may each respond differently to a variety of environmental factors and thereby adversely affect the pathlength difference between the two counter-propagating waves. Some of these environmental factors include temperature and mechanical strain that may create a bias between the phases of the two counter-propagating waves such that the output of the sensing coil yields a phase difference between the two counter-propagating waves that is indistinguishable from a rotation-induced phase difference. During operation, a FOG may be placed in an environment having a fluctuating ambient temperature. Temperature variations affect the sensing coil in two ways: first, the sensing coil undergoes mechanical strain as a result of a differential thermal expansion; and second, the optical transmission properties of the optical fiber change with the temperature. A Coefficient of Thermal Expansion (CTE) mismatch between the glass/silica core and the polymer buffer may result in a transverse expansion of the fiber optic coil that is significantly larger than the lengthwise expansion of the fiber optic coil. Because of the non-isotropic structure of the fiber optic coil, the radial expansion of the fiber optic coil, constrained by the glass/silica core of the optical fiber, is significantly smaller than the axial expansion of the fiber optic coil that is dominated by the large CTE of the polymer buffer. Further, the outer diameter of the fiber optic coil generally expands radially away from the center axis of the fiber optic coil while the inner diameter of the fiber optic coil generally expands radially toward the center axis of the fiber optic coil.

In addition to the expansion of the fiber optic coil, the hub may also expand in response to temperature fluctuations. For example, a hub made from an isotropic material may expand relatively uniformly in both the axial direction and in the radial direction with respect to the center axis. As a result, when a FOG is exposed, to a temperature change such that the fiber optic coil and hub both expand, the hub radially expands faster than the fiber optic coil expands, as a whole, and imparts stress on the fiber optic coil. Additionally, the radial expansion of the hub against the opposite expansion direction of the inner diameter of the fiber optic coil may produce significant mechanical interference between these components resulting in an outward radial pressure exerted at the fiber optic coil interface that induces stresses in the coil structure.

Employing a compliant adhesive, that distorts to accommodate the outward radial expansion of the hub as well as the inward radial expansion of the inner diameter of the fiber optic coil, may minimize such stresses on the fiber optic coil. When the adhesive is softer than the hub material, the stress induced in the fiber optic coil is generally less than the stress induced by the expanding hub alone. The hydrostatic pressure associated with the axial compression of the adhesive material is relieved through its expansion in lateral directions to the extent allowed by hyper-elastic properties of the adhesive material and by the available free area around the adhesive.

One method of applying the compliant adhesive is to inject a liquid adhesive, such as a Room Temperature Vulcanizing (RTV) adhesive, through small orifices in the mounting structure (e.g., a coil hub). Typically, the RTV adhesive is a two-part adhesive that is first mixed and then manually injected through the orifices of the bottom surface of the mounting structure via controlled nozzles. Following a curing period, the two-part adhesive is prepared again and then manually injected through the orifices of the top surface of the mounting structure via the controlled nozzles. The sensing coil mounting process is complete after another curing period. The combination of the curing periods for the RTV adhesive and the manual effort to inject the RTV adhesive generally consumes a significant amount of process time.

In addition to the significant process time, the manufacture of conventional coil hubs is generally labor intensive. Small variations in fiber buffer diameter may accumulate and result in a significant variation in coil height from one fiber optic coil to another fiber optic coil. In general, fiber optic coils are measured after fabrication of the coils, and the coil hubs supporting such fiber optic coils are custom sized to the coils. Typically, the coil hubs are pre-machined and subsequently re-machined after measuring the fiber optic coils. This custom machining of the coil hub complicates the manufacturing process of the FOG. Additionally, when mounting the inner cylindrical surface of the fiber optic coil to the outer cylindrical surface of the coil hub, the clearance between these surfaces may further complicate the mounting process. For example, an RTV adhesive applied to the outer cylindrical surface of the hub may be smeared during the mounting process when the hub and the sensing coil have an insufficient clearance therebetween.

Accordingly, it is desirable to provide a less complex method for attaching a cylindrical inner surface of a sensing coil to a cylindrical outer surface of a support structure in a fiber optic gyroscope while minimizing the coil stress from environmental factors. In addition, it is desirable to provide a sensing coil assembly for a fiber optic gyroscope having minimal construction steps while decreasing the coil stress from environmental factors. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A sensing coil assembly for a fiber optic gyroscope and methods are provided for attaching a sensing coil to a mounting structure in a fiber optic gyroscope. In an exemplary embodiment, the method comprises affixing a preformed adhesive to a radial mating surface of the mounting structure, and coupling an inner surface of the sensing coil to the mating surface of the mounting structure via the preformed adhesive. The mounting structure has first and second ends and an axis, and the radial mating surface extends between the first and second ends and about the axis.

In another exemplary embodiment, the sensing coil assembly comprises a hub having first and second ends, an axis, and a radial mating surface, an optical fiber coil having an inner surface encircling at least a portion of the mating surface, and a preformed adhesive pattern affixing the mating surface to the inner surface. The radial mating surface extends between the first and second ends and about the axis.

In yet another exemplary embodiment, the method comprises the steps of determining a clearance between an inner surface of the sensing coil and an outer surface of the mounting structure, affixing a preformed adhesive to the inner surface of the sensing coil, and coupling the outer surface of the mounting structure to the inner surface of the sensing coil via the preformed adhesive. The preformed adhesive has a predetermined thickness substantially equal to or greater than the clearance.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
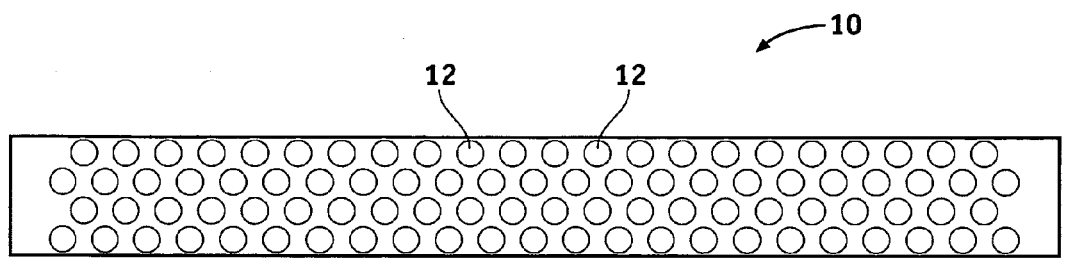
FIG. 1 is an elevational view of a preformed adhesive pattern for a fiber optic gyroscope in accordance with an exemplary embodiment of the present invention.

Referring now to the drawings, FIG. 1 is an elevational view of a preformed adhesive pattern 10 for a Fiber Optic Gyroscope (FOG) in accordance with an exemplary embodiment of the present invention. The preformed adhesive pattern 10 comprises a two-sided dry visco-elastic dampening polymer, or other pressure sensitive material, that is preformed (e.g., precut from a layer of the dry visco-elastic damping polymer) into a variety of substantially uniform patterns. In this exemplary embodiment, the preformed adhesive pattern 10 is a substantially uniform array of adhesive dots 12. The preformed adhesive pattern 10 may include a backing (e.g., top and/or bottom backings) to protect the two sides of the adhesive and to assist in placing the adhesive pattern on a sensing coil or a coil hub. For example, the preformed adhesive patterns 10 may be manipulated as a single unit using the backings and affixed to the sensing coil or coil hub by removing one backing. The backings of the preformed adhesive pattern 10 is removed to expose the adhesive prior to applying the adhesive patterns to the sensing coil and/or the coil hub.

Figure 2:
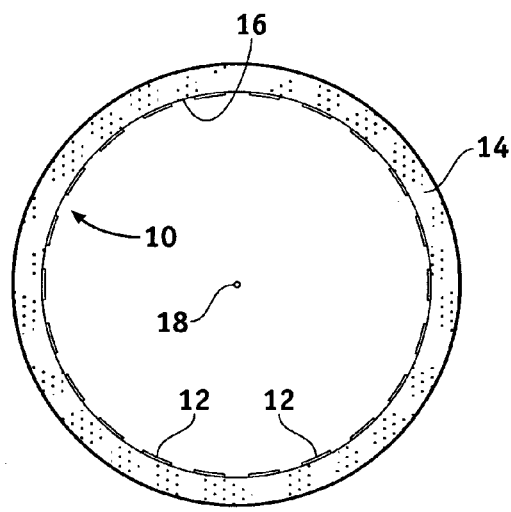
FIG. 2 is a top view of a sensing coil and a preformed adhesive pattern in accordance with an exemplary embodiment of the present invention.
Figure 3:
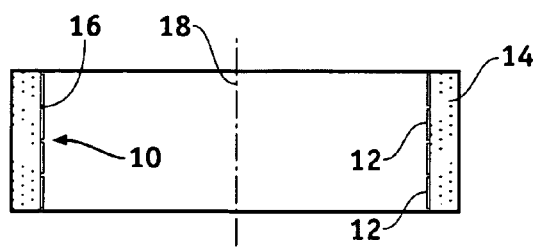
FIG. 3 is a cross-sectional view of the sensing coil and preformed adhesive pattern shown in FIG. 2.

FIG. 2 is a top view of a sensing coil 14 and the preformed adhesive pattern 10 in accordance with an exemplary embodiment of the present invention. FIG. 3 is a cross-sectional view of the sensing coil 14 and the preformed adhesive pattern 10 shown in FIG. 2. The sensing coil 14 comprises a wound optical fiber made from a glass medium. The optical fiber has an inner glass core and an outer glass shell, and the inner glass core and the outer glass shell have different optical indices of refraction. A polymer coating, or jacket, covers the outer glass to protect the surface of the outer glass from defects. In general, the optical fiber is specifically wound onto a bobbin, adhered, and cured to form the sensing coil 14 although other methods may be used to produce the sensing coil 14 from the optical fiber. The sensing coil 14 has a relatively thick cylindrical wall of optical fiber and has a substantially cylindrical inner surface 16 for coupling to a coil hub via the preformed adhesive pattern 10. In this exemplary embodiment, the preformed adhesive pattern 10 is affixed to the inner surface 16 of the sensing coil 14.

Figure 4:
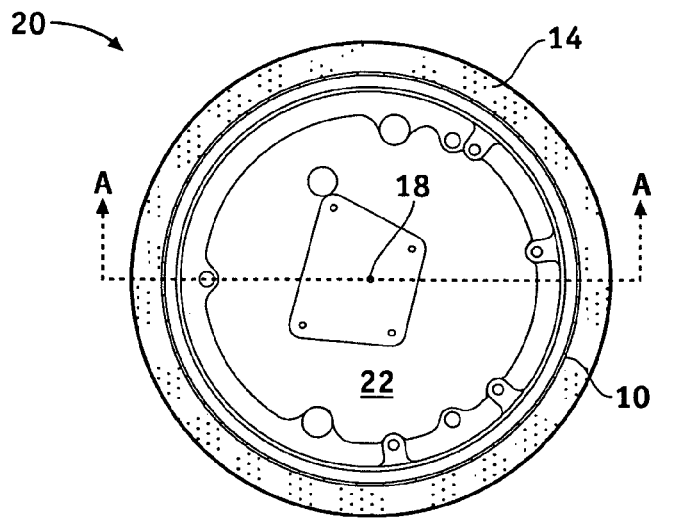
FIG. 4 is a top view of a sensing coil assembly in accordance with an exemplary embodiment of the present invention.
Figure 5:
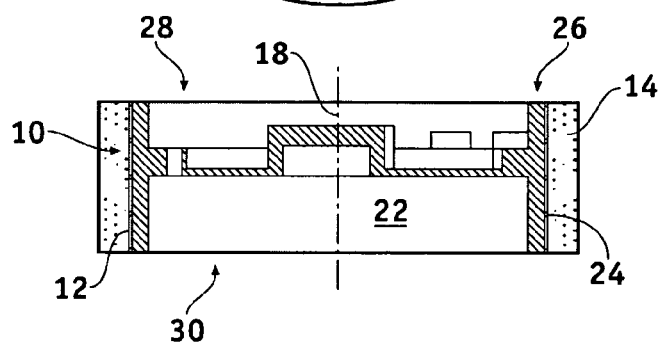
FIG. 5 is cross-sectional view of the sensing coil assembly shown in FIG. 4 taken along line A-A.

FIG. 4 is a top view of a sensing coil assembly 20 in accordance with an exemplary embodiment of the present invention. FIG. 5 is cross-sectional view of the sensing coil assembly 20 shown in FIG. 4 taken along line A-A. The sensing coil assembly 20 comprises a support structure 22, such as a coil hub, the sensing coil 14 surrounding at least a portion of the support structure 22, and the preformed adhesive pattern 10 affixing the sensing coil 14 to the support structure 22. The support structure 22 has first and second ends 28 and 30, an axis 18, and a radial mounting surface 24, or mating surface, extending between the ends of the support structure 22 about the axis 18. In an exemplary embodiment, the support structure 22 comprises a substantially cylindrical wall 26 having a substantially cylindrical outer mounting surface 24 for coupling with the sensing coil 14 via the preformed adhesive pattern 10. In an alternative embodiment, the support structure 22 comprises a mating surface having a diameter that decreases from one end of the support structure to the other end of the support structure, such as substantially conical wall having a substantially conical mating surface. When combined to form the sensing coil assembly 20, both the sensing coil 14 and the support structure 20 are oriented about an axis 18 of the cylindrical wall 26 (e.g., the sensing coil 14 is coaxial with the support structure 20).

The support structure 20 may be made from a variety of materials. Exemplary hub materials include, but are not limited to: metal alloys, such as titanium; sintered metal composites made using powder metallurgy, such as copper tungsten or copper molybdenum; composite materials, such as filament wound fiber glass/epoxy, fiber glass/epoxy or aramid/epoxy; metal matrix composites, such as metal reinforced with ceramics such as boron, silicon, carbide, and graphite; ceramics; and, a composite made from any of the aforementioned materials. The selection of hub material may be based in part on a particular application of the FOG and may influence the choice of both the adhesive and support structure 22 to optimize the particular application.

In this exemplary embodiment, the preformed adhesive pattern 10 is positioned between the inner surface 16 of the sensing coil 14 and the outer mounting surface 24 of the support structure 22. The preformed adhesive pattern 10 may be preloaded with a predetermined compression upon affixing to the outer mounting surface 24 of the support structure 20. The preformed adhesive pattern 10 significantly reduces reaction load that may be applied to the sensing coil 14 during expansion and contraction, such as from temperature fluctuations, and thereby minimizes distortion of the sensing coil 14. Additionally, using preformed and substantially non-liquid adhesive patterns significantly reduces process time for attaching the sensing coil 14 to the support structure 20. For example, by affixing the preformed adhesive pattern 10 to the outer mounting surface 24 of the support structure 20 and after aligning the sensing coil 14 with the support structure 20 (e.g., axial alignment), the support structure 20 may be inserted into the sensing coil 14 during mounting.

Figure 6:
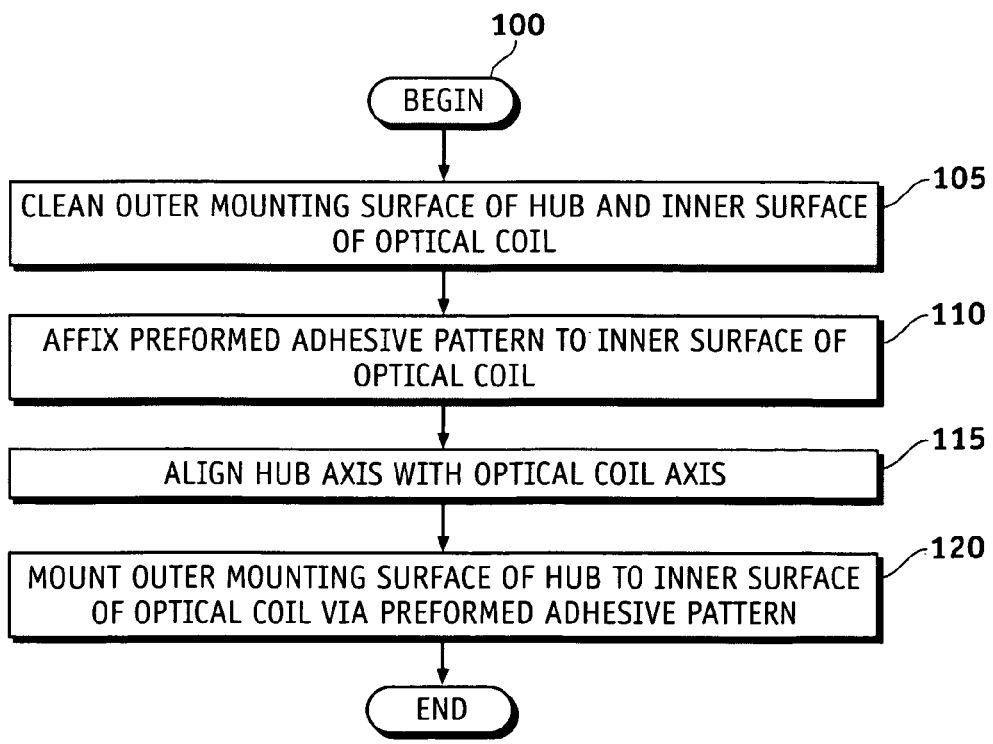
FIG. 6 is a flow diagram of a method for attaching a sensing coil to a support structure in a fiber optic gyroscope in accordance with an exemplary embodiment of the present invention.

FIG. 6 is a flowchart of a method for attaching a sensing coil to a support structure in a fiber optic gyroscope in accordance with an exemplary embodiment of the present invention. Referring to FIGS. 5 and 6, the method begins at step 100. The outer mounting surface 24 of the support structure 20 and the inner surface 16 of the sensing coil are cleaned and prepared for applying the preformed adhesive pattern 10 at step 105. The preformed adhesive pattern 10 is applied or affixed to the outer mounting surface 24 at step 110. The backing on one side of the preformed adhesive pattern 10 is removed to expose the adhesive while the backing on the other side of the preformed adhesive pattern 10 protects the adhesive during application of the preformed adhesive pattern 10. The preformed adhesive pattern 10 may be preloaded with a predetermined compression (e.g., a 0.005 in. compression depth). After applying the preformed adhesive pattern 10 to the outer mounting surface 24, the remaining backing is removed. The sensing coil 14 is axially aligned (e.g., aligned with the axis 18 of the cylindrical wall 26 of the support structure 20) at step 115. The outer mounting surface 24 of the support structure 20 is coupled or affixed to the inner surface 16 of the sensing coil 14 via the preformed adhesive pattern 10 at step 120. Prior to step 120, the clearance between the inner surface 16 of the sensing coil 14 and the outer mounting surface 24 of the support structure 20 may be determined. The preformed adhesive pattern 10 may have a pre-determined thickness based on this clearance. Additionally, the radial dimension of the support structure 20 may be reduced prior to step 120, and the radial dimension of the support structure 20 may be returned to an original dimension after step 120. For example, the radial dimension (e.g., the diameter of the outer mounting surface 24) of the support structure 20 may be reduced by cooling (e.g., using liquid nitrogen, a non-corrosive cooling agent, or the like) the support structure 20 and returned to the original dimension by warming the support structure 20 (e.g., via ambient heating or the like). Alternatively, a radial dimension of the sensing coil 14 may be increased (e.g., via ambient heating or the like) prior to step 120, and the radial dimension of the sensing coil 14 may be returned to an original dimension after step 120.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for attaching a fiber optic gyroscope sensing coil to a mounting structure, the method comprising the steps of:

affixing a preformed adhesive to a radial mating surface of the mounting structure, the mounting structure having first and second ends and an axis, the mating surface extending between the first and second ends and about the axis;

determining a clearance between an inner surface of the sensing coil and the mating surface of the mounting structure; and coupling the inner surface of the sensing coil to the mating surface of the mounting structure via the preformed adhesive.

2. The method according to claim 1, wherein the preformed adhesive has a predetermined thickness substantially equal to or greater than the clearance.

3. The method according to claim 1 further comprising the step of cleaning the mating surface of the mounting structure prior to said affixing step.

4. The method according to claim 1 further comprising the step of aligning a longitudinal axis of the sensing coil with a longitudinal axis of the mounting structure prior to said coupling step.

5. The method according to claim 1, wherein said affixing step comprises compressing the preformed adhesive with a predetermined preload against the mating surface of the mounting structure.

6. The method according to claim 1, wherein the preformed adhesive comprises at least one of a pressure sensitive adhesive and a visco-elastic dampening polymer.

7. The method according to claim 1, wherein the mating surface is selected from one of a substantially cylindrical surface and a substantially conical surface.

8. The method according to claim 1 further comprising the steps of:

reducing a radial dimension of the mounting structure prior to said affixing step; and returning the radial dimension of the mounting structure to an original dimension after said affixing step.

9. A method for attaching a sensing coil to a mounting structure in a fiber optic gyroscope, the method comprising the steps of:

determining a clearance between an inner surface of the sensing coil and a mating surface of the mounting structure;

affixing a preformed adhesive to the inner surface of the sensing coil, the preformed adhesive having a predetermined thickness substantially equal to or greater than the clearance; and coupling the mating surface of the mounting structure to the inner surface of the sensing coil via the preformed adhesive.

10. The method according to claim 9 further comprising the step of cleaning the mating surface of the mounting structure prior to said affixing step.

11. The method according to claim 9 further comprising the steps of:

increasing a radial dimension of the inner surface of the sensing coil prior to said affixing step; and returning the radial dimension of the inner surface of the sensing coil to an original dimension after said affixing step.

12. The method according to claim 9 further comprising the steps of:

reducing a radial dimension of the mounting structure prior to said affixing step; and returning the radial dimension of the mounting structure to an original dimension after said affixing step.

* * * * *